R. RUMMLER.
CASH REGISTER.
APPLICATION FILED JULY 26, 1915.
1,230,928.
Patented June 26, 1917.
10 SHEETS—SHEET 2.
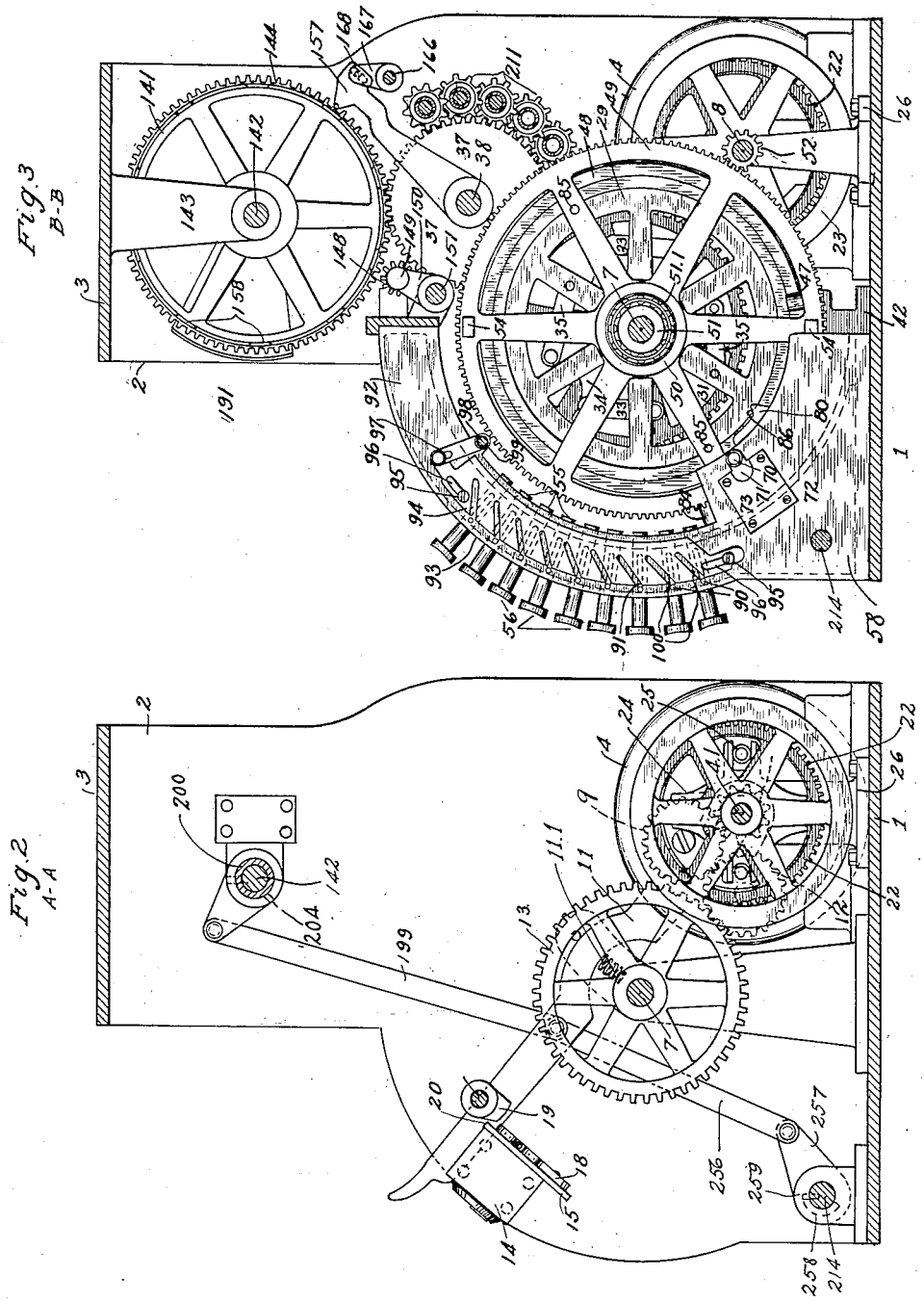
Witness:
Walter F. Stone
Inventor
Rudolm Rummler
By Rummler & Rummler
Attys.

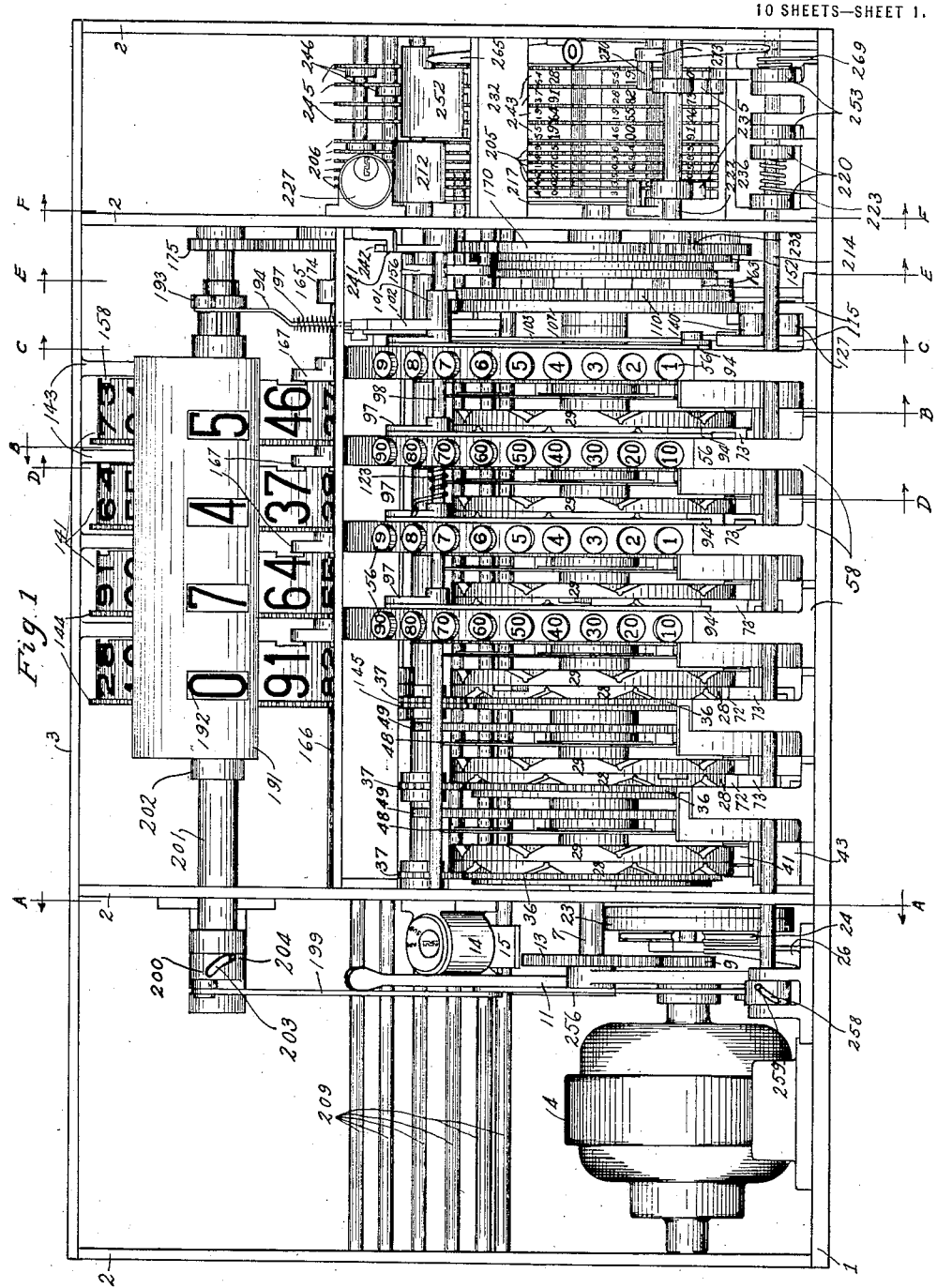

R. RUMMLER.
CASH REGISTER.
APPLICATION FILED JULY 26, 1915.

1,230,928.

Patented June 26, 1917.
10 SHEETS—SHEET 3.

Witness
Walter F. Stone

Inventor
Andrew Rummler
By Rummler & Rummler
Attys.

R. RUMMLER.
CASH REGISTER.
APPLICATION FILED JULY 26, 1915.
1,230,928.
Patented June 26, 1917.
10 SHEETS—SHEET 4.
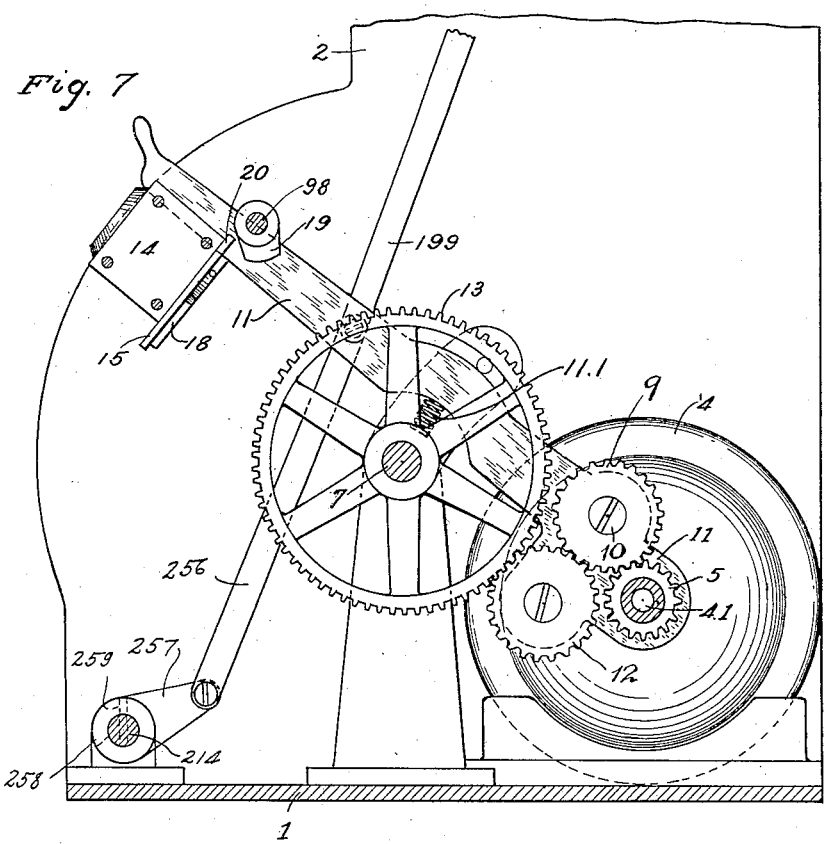
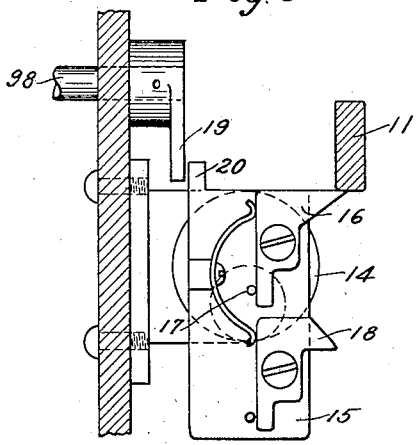
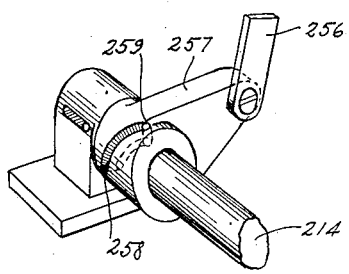

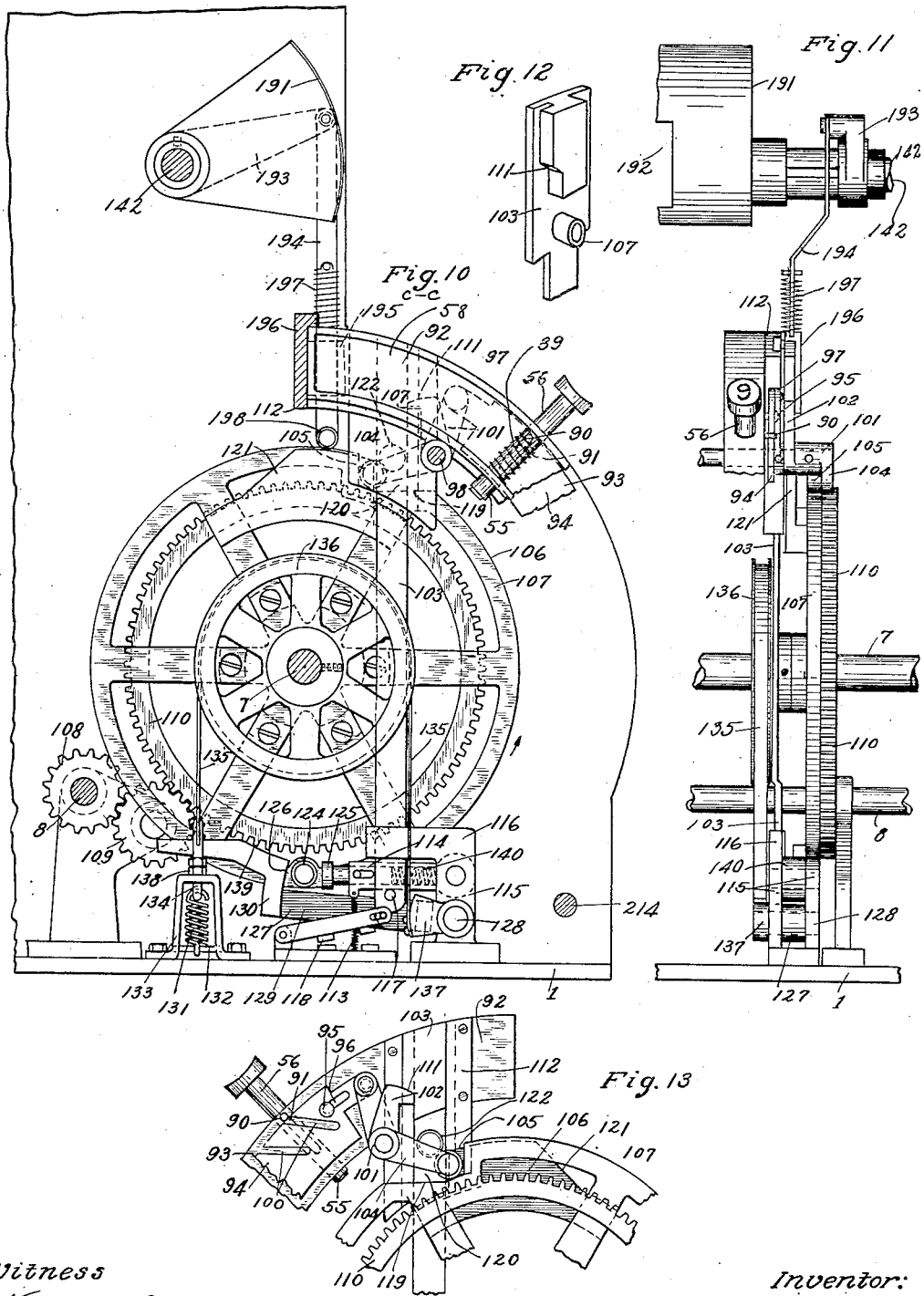

R. RUMMLER.
CASH REGISTER.
APPLICATION FILED JULY 26, 1915.
1,230,928.
Patented June 26, 1917.
10 SHEETS—SHEET 6.
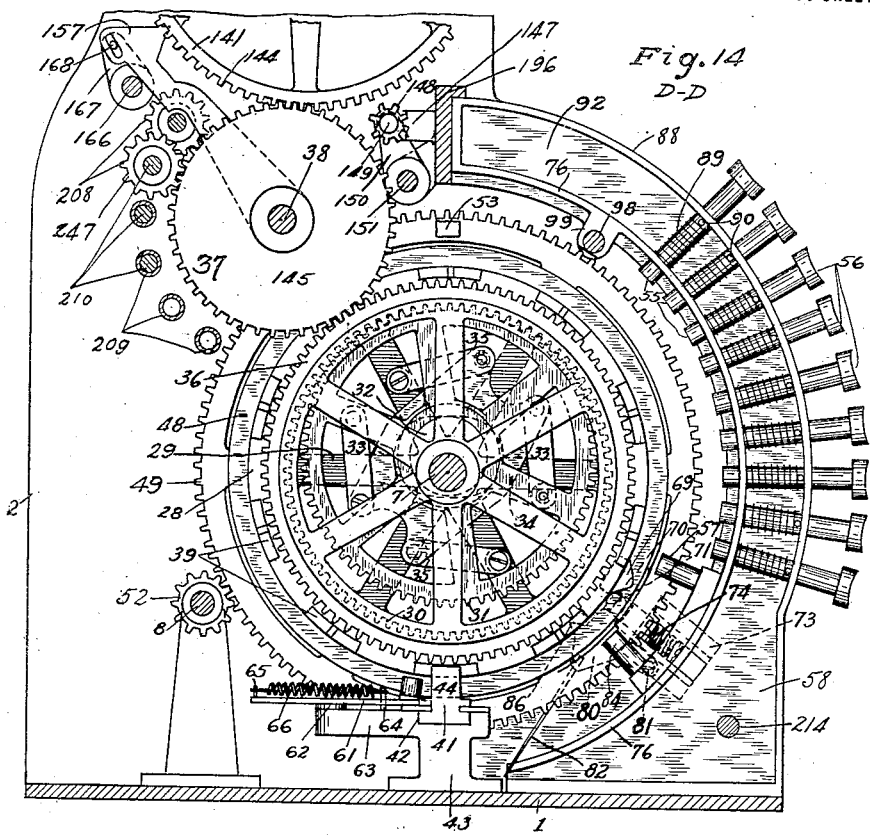
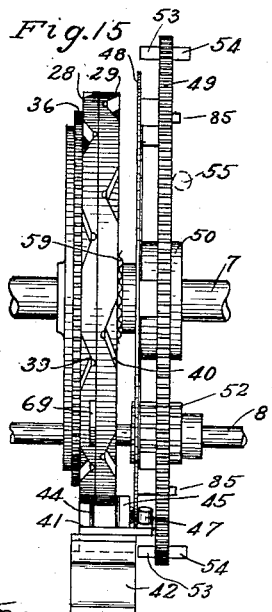
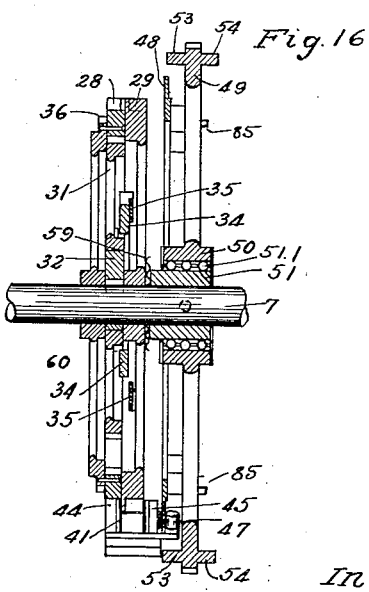
Witness:
Walter J. Stone
Inventor:
Andrew Rummler
By Rummler & Rummler
Attys.

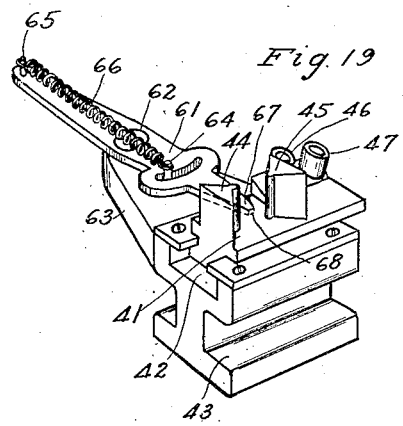
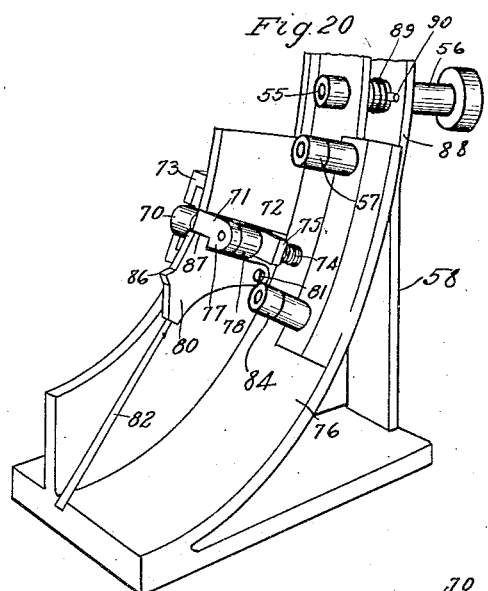
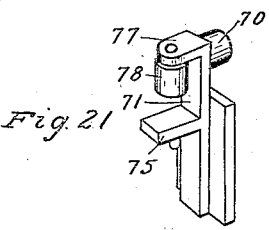
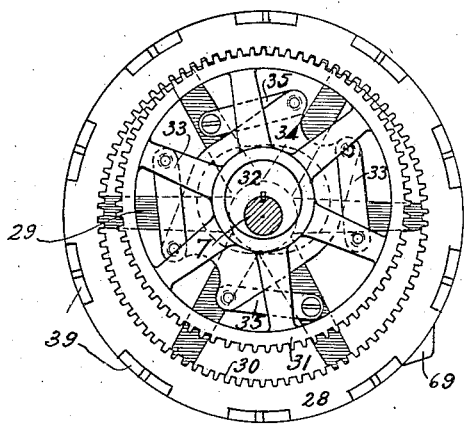
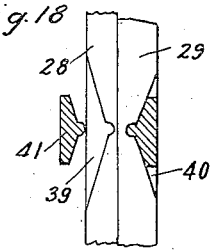

R. RUMMLER.
CASH REGISTER.
APPLICATION FILED JULY 26, 1915.
1,230,928.
Patented June 26, 1917.
10 SHEETS—SHEET 8.
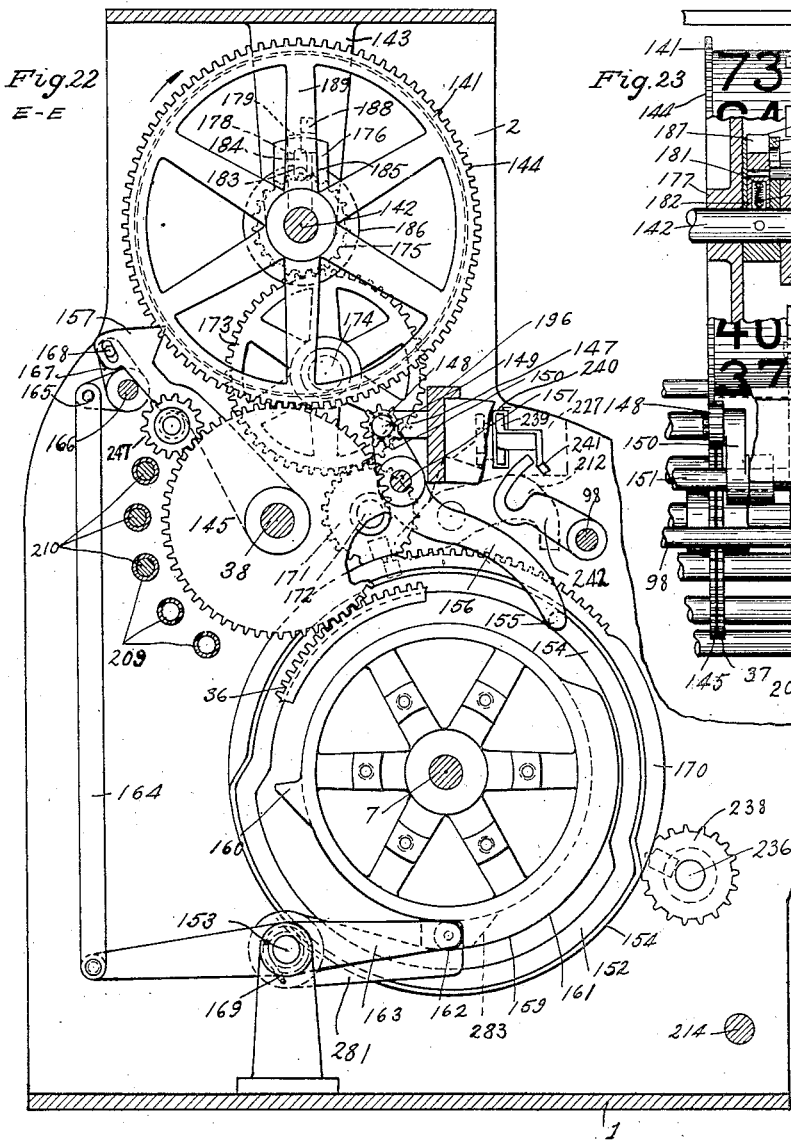
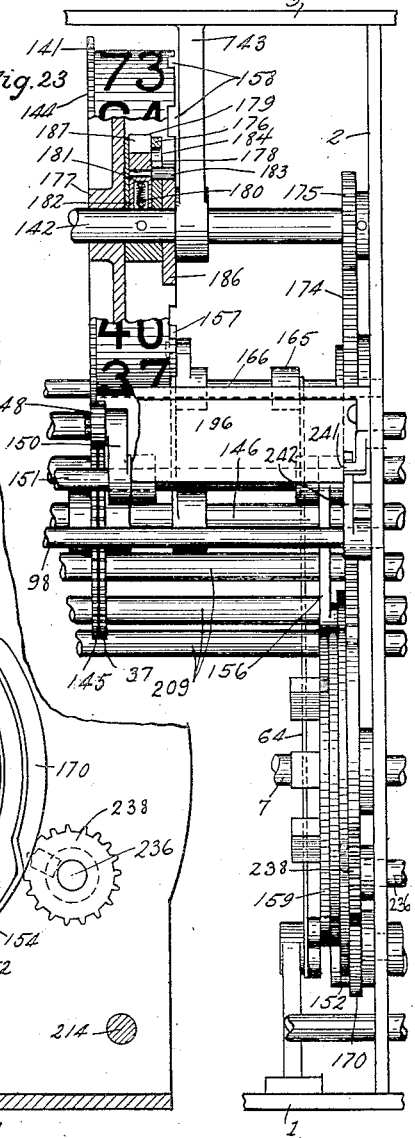
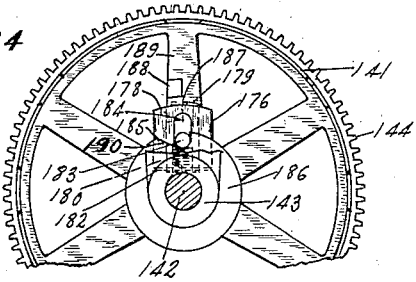
Witness:
Walter F. Stone
Inventor:
Rudow Rummler
By Rummler & Rummler
Attys.

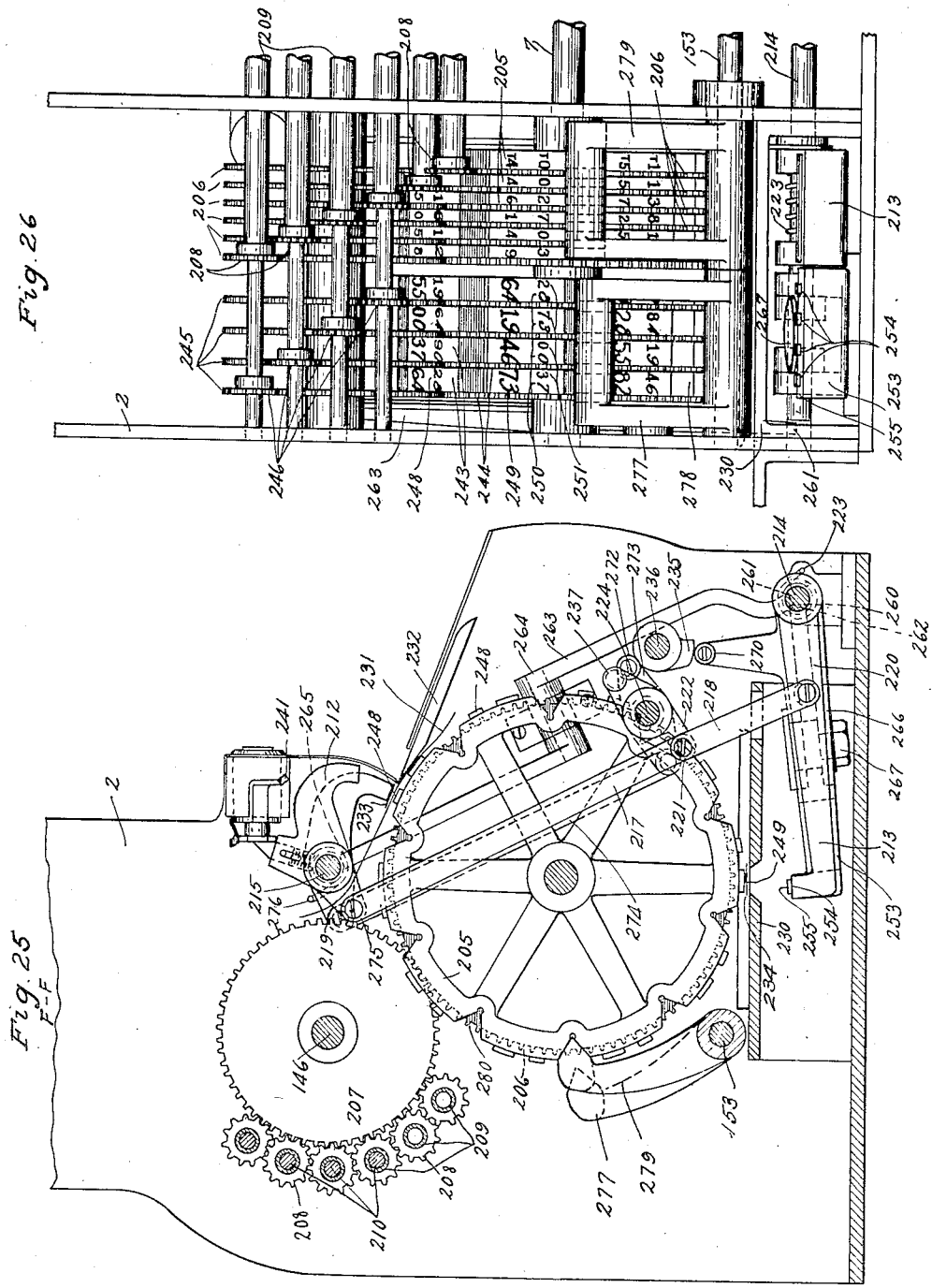

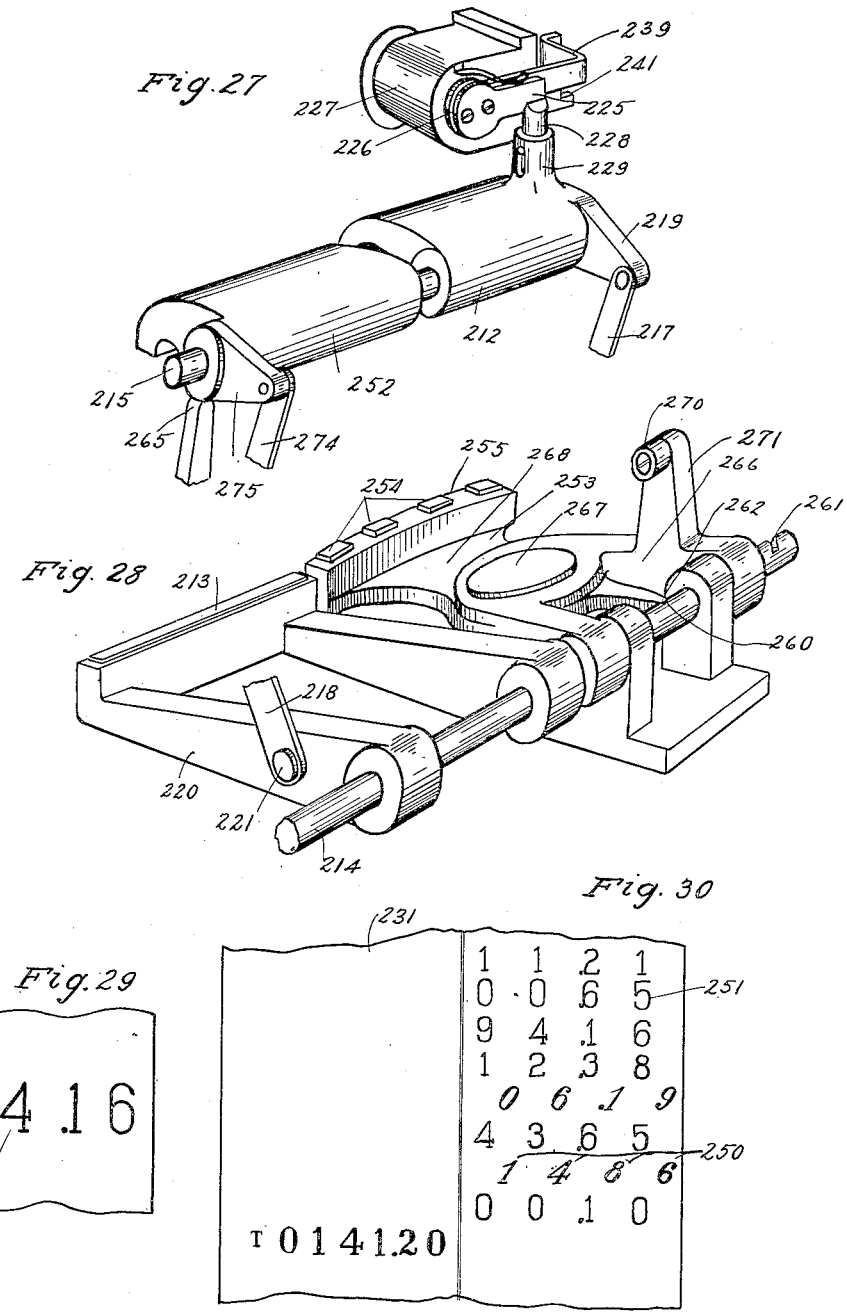

UNITED STATES PATENT OFFICE.

RUDOW RUMMLER, OF WILMETTE, ILLINOIS.

CASH-REGISTER.

1,230,928.

Specification of Letters Patent. Patented June 26, 1917.

Application filed July 26, 1915. Serial No. 42,018.

*To all whom it may concern:*

Be it known that I, RUDOW RUMMLER, a citizen of the United States of America, and a resident of Wilmette, county of Cook, and State of Illinois, have invented certain new and useful Improvements in Cash-Registers, of which the following is a specification.

The purpose of this invention in its general aspects, is to provide a key-coupled, key-controlled, adding and subtracting, total-printing and motor driven cash register; and to provide a cash register of comparatively high speed for the purpose of reducing the time required in entering transactions therein.

A specific object of the invention is to provide improvements in key-controlled motor driven cash registers whereby a combination of value keys may be simultaneously depressed and coupled together to insure the desired operation of the machine when so arranged that the motor is under the control of any one or combination of value keys in different denominational banks.

Another object of the invention is to provide improvements in the construction of cash registers whereby the time required in entering transactions is materially lessened.

Another object of the invention is to provide an improved mechanical motion for performing accounting operations.

Another object of the invention is to provide means for entering in the machine, by subtracting, bank deposits, whereby the total retained in the machine may always correspond with the amount of cash in the cash drawer.

Another object of the invention is to avoid the necessity of resetting the totalizer, except by regular operations of the machine, involving the recording of the amounts subtracted from the totalizer on such resetting operations.

Another object of the invention is to provide improvements in the construction of cash registers which particularly fit them for a motor drive, and whereby a clutch between the motor and the driven mechanism of the machine is not required, and other usual mechanisms are dispensed with.

Other objects of the invention are to combine with cash registers, a high efficiency reduction gearing between the motor and a driven shaft; and to provide various improvements in operating mechanism, indicators and printing devices particularly applicable to cash registers, listing machines, etc.

An illustrative embodiment of this invention is shown in the accompanying drawings, in which—

Fig. 1 shows a front elevation with the cabinet removed and the cash drawer omitted, of a cash register constructed according to this invention.

Fig. 2 shows a transverse vertical section taken on the line A—A of Fig. 1.

Fig. 3 shows a transverse vertical section taken on the line B—B of Fig. 1.

Fig. 7 is a detail drawing of a side elevation of mechanism for reversing the machine for the purpose of performing subtracting operations.

Fig. 8 is a detail of a lock for controlling the mechanism shown in Fig. 7.

Fig. 9 is a detail of part of the mechanism shown in Fig. 7.

Fig. 10 is a transverse vertical section taken on the line C—C of Fig. 1.

Fig. 11 is a front elevation of the mechanism shown in Fig. 9.

Fig. 12 is a fragmentary detail in perspective of a slide cam which is part of the controlling mechanism shown in Figs. 9 and 10.

Fig. 13 is a fragmentary detail of mechanism shown in Fig. 9, but as viewed from the opposite side.

Fig. 14 is a transverse vertical section taken on the line D—D of Fig. 1.

Fig. 15 is a detail front elevation of one of the denominational units of the totalizer.

Fig. 16 is a sectional view of the mechanism shown in Fig. 14.

Fig. 17 is a detail in side elevation of part of one of the denominational units of the totalizer.

Fig. 18 is an enlarged fragmentary detail of the totalizer.

Fig. 19 shows a perspective detail of one of the latches for controlling the totalizer.

Fig. 20 is a fragmentary perspective view of one of the key banks, and includes transfer mechanism.

Fig. 21 is a perspective detail of part of the transfer mechanism.

Fig. 22 is a transverse vertical section taken on the line E—E of Fig. 1.

Fig. 23 shows a front elevation of the mechanism appearing in Fig. 22.

Fig. 24 is a detail of part of the indicator restoring mechanism.

Fig. 25 is a transverse vertical section taken on the line F—F of Fig. 1, which shows the printing mechanism.

Fig. 26 is a front elevation of the printing mechanism.

Fig. 27 is a perspective detail of the platen mechanism for the item strip.

Fig. 28 is a perspective detail of the platen mechanism for a receipt strip or inserted slip.

Fig. 29 is a fragmentary detail of a printed slip.

Fig. 30 is a fragmentary detail of an item strip.

Figure 5:
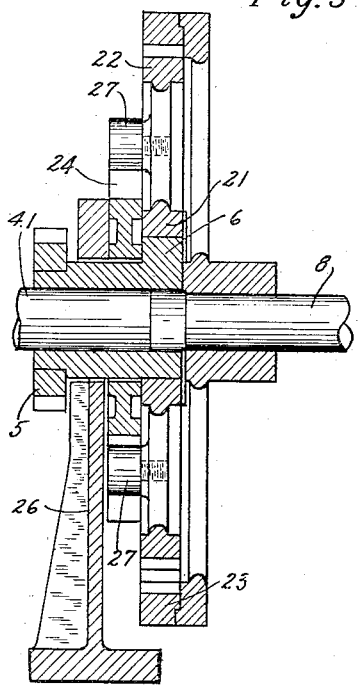
Fig. 5 shows a transverse vertical section of the reduction gearing shown in Fig. 4.

Motor driven cash registers now generally in use are a development of, and constructed along the lines of cash registers which are manually driven by a rotatable crank or its equivalent. The leverage from the motor to the driven elements of the machine is not much in favor of a motor, since the operating mechanism of the machine is designed to be driven by a single rotation or oscillation of the drive shaft. Therefore, the resistance to rotation of such drive shaft is comparatively great, and in providing such machine with a motor, it is necessary to include clutch mechanism between the motor and drive shaft in order that the motor need not start with full load, or be suddenly stopped on the completion of operations of the machine.

It is also impracticable to use a light high speed motor under such circumstances because it would require an excessive speed reduction between the motor and the driven shaft. The single rotation or oscillation of the drive shaft requires that the various successive operations of restoring, engaging the totalizer, adding, disengaging the totalizer, transferring, alining impression and check-cutting be performed with extreme rapidity with respect to the comparatively slow motion of the shaft from which the operating power is derived. Such conditions necessarily result in hard cam actions, pounding, and straining in the machine. This is particularly true in that class of accounting machines which effect differential motions by a driven member being suddenly stopped at various points along its possible extreme movement, or in such machines wherein the differential action is effected by some moving part engaging and picking up an actuator at different points along its path of movement. In both cases there is considerable fluctuation during the operation of the machine, in the actual load carried.

The leverage throughout the present machine is so arranged that the totalizer elements could execute a complete rotation, or other required operations be performed, only upon a considerable number of rotations of the drive shaft. The totalizer consists of a plurality of pairs of rotary elements, and one or the other of the members of each pair is rotated during the entire operation of the machine. By stopping one member of a pair, the other member is compelled to move, or its movement is accelerated in such manner that the input of work in the totalizer is practically constant per operation of the machine, regardless of the differential action between the said members as controlled by the keys.

Another characteristic difference between this machine and prior key-controlled accounting machines is that the keys may be coupled together in a manner somewhat similar to that occurring in key-operated cash registers.

In general features, the machine shown in the drawings consists of a comparatively large totalizing mechanism occupying a cylindrical space in the center of the machine, the controlling key banks being arranged in a semi-circle outside of said totalizing mechanism. The totalizing mechanism is mounted on a rotatable shaft and consists of a plurality of denominational pairs of wheels. The shaft is arranged to normally idly drive one member of each denominational element, the remaining companion members being normally latched against movement. The mechanical connections between each pair of elements in the totalizer is such that if one element is prevented from rotating during the rotation of the drive shaft, the remaining element is correspondingly compelled to rotate. The members of the totalizer which are normally latched against movement may be geared to total printing, item printing and indicator devices. Latch devices under the control of the keys are provided for releasing and engaging one or the other of the members of each denominational element of the totalizer, and thus determine the extent of movements which are imparted to the totalizing, recording, and indicating mechanisms. These latching devices are also under control of the totalizer for the purpose of effecting transfers from denominational elements of lower order to elements of higher order. To effect subtracting operations, the direction of rotation of the shaft which drives the totalizer is reversed, the keys, latch and transfer mechanism operating in the same manner as when performing additions.

Referring to the drawings, the operating mechanism is supported on a base 1 and between a plurality of transverse vertical frames 2, which are rigidly connected to frame 1 and also tied together at the top by a frame member 3. Power is furnished to the machine through a motor 4, the armature shaft 4.1 of which, carries a gear 5 and an eccentric 6 (Fig. 5) for respectively driving the two main drive shafts 7 and 8.

The gear 5 meshes with a gear 9 (Fig. 7) journaled on a stub-shaft 10 carried by a rocker arm 11. The gear 9 meshes with a gear 12, also journaled on a stub-shaft carried by the rocker arm, and this arm may be rocked to positions for either engaging the gear 9 or the gear 12 to a gear 13 rigid on drive shaft 7. In this manner the direction of rotation of shaft 7 is determined as required for operations of addition or subtraction. The arm 11 is arranged to be normally locked in the adding position by a lock 14, the rotating drum of which is rigid with a plate 15 upon which is mounted a spring actuated pawl 16.

The pawl 16 is normally in the path of rocker arm 11 when the same is in its normal position, preventing the arm from being rocked to the subtracting position. The pawl 16 is prevented from rocking in one direction by a stationary pin 17, but is free to rock in the other direction to permit the passage of rocker arm 11 when the same is being restored to normal position. When the arm 11 is shifted to the subtracting position, it is latched in such position by a pawl 18, also pivoted on the plate 15.

By inserting a key in lock 14 and turning the same to the subtracting position, the plate 15 is rocked to the left (Fig. 8), thus disengaging the pawl 16 from arm 11. This arm may then be rocked downwardly to the subtracting position in which gear 12 is disengaged from gear 13 and gear 9 engaged therewith. In adding operations the motion is transmitted from gear 5 through gears 9, 12 and 13 to shaft 7, whereas in subtracting operations the motion is transmitted from gear 5 through gears 9 and 13 to shaft 7, reversing its direction. The teeth of the gears 9, 12 and 13 are made especially long so that the gear 12 will mesh with gear 13 before the gear 9 is entirely unmeshed therefrom, and vice versa during the shifting of rocker arm 11. The teeth of the gears are so made in order to prevent shafts 7 and 8 from rotating independently of each other and thereby destroying the constant relationship between the shafts which is necessary for the successful operation of the particular machine shown.

Manipulation of rocker arm 11 is prevented during the operation of the machine by an oscillating cam member 19 (Fig. 2) which moves into the path of a lug 20 on plate 15 when the machine is operating.

The gear ratio between the motor 4 and gear 13 is 4 to 1. Thus, for example, if the motor is rotating at a speed of 1800 R. P. M., shaft 7 will rotate at the rate of 450 R. P. M.

Figure 4:
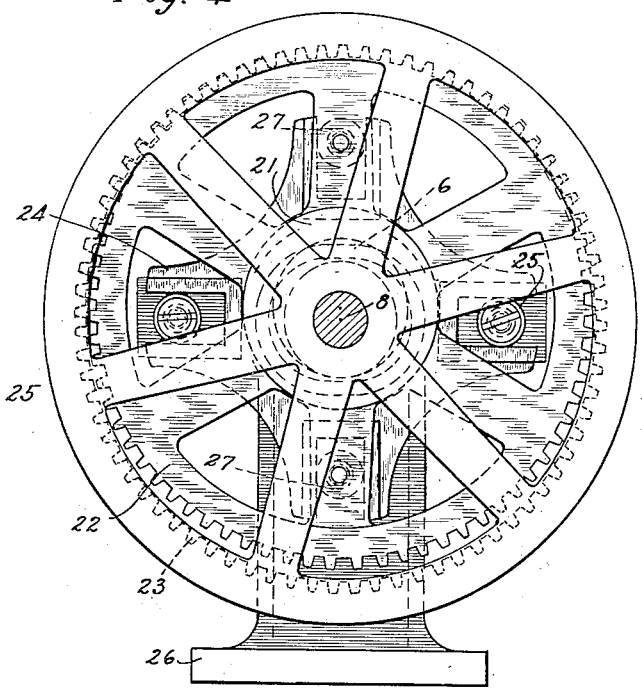
Fig. 4 represents a detail in side elevation of a reduction gearing between the motor and one of the drive shafts.

The eccentric 6 (Figs. 4 and 5) which is carried rigidly on the motor shaft 4.1 revolves within the hub 21 of an external gear 22 meshing with an internal gear 23 rigidly secured to shaft 8 in alinement with motor shaft 4.1. The gear 22 is prevented from rotating on its axis by the cross-shaped member 24 which is slidably mounted on a pair of rollers 25 carried by the bearing member or supporting frame 26, and a pair of rollers 27 mounted on the spokes of gear 22. This gearing operates to effect a considerable reduction in speed from the shaft 4.1 to shaft 8, and in a well known manner the eccentric or sweeping action imparted to gear 22 by eccentric 6, while said gear is prevented from rotating, results in driving gear 23 at a considerable reduction in speed, and with an almost total absence of friction, since a great number of teeth of such gearing are constantly in engagement and have no sliding action between the surfaces of the teeth. In the operation of the gearing the teeth intermesh before actually engaging one another.

The particular reduction which is accomplished in the present arrangement is $19\frac{1}{5}$ to 1, shaft 4.1 making 96 rotations, while shaft 8 makes 5 rotations per operation of the machine. The function of shaft 8 is to drive the controlling mechanism of the machine, including mechanism mainly under the control of the keys and means for opening the motor circuit and stopping the machine. It also serves to restore the indicators and operate the impression mechanism.

*Totalizer.*

There is a pair of wheels 28 and 29 (Figs. 1, 15, 16 and 17) in each denominational element of the totalizer. The wheels 28 have internal teeth 30 for engagement with external gears 31 rotatably mounted on eccentrics 32 rigid with shaft 7. The gears 31 are connected by links 33, plate 34 and links 35 with the wheels 29. Links 33 may be pivoted to the spokes of gear 31, while the links 35 are pivoted to the spokes of wheel 29, and all the links are pivoted at their opposite ends to the plate 34. If wheel 29 is held stationary and shaft 7 is rotated, the eccentrics 32 will cause the gears 31 to travel bodily in a circular path within the wheels 28. The link connection between the gears 31 and the wheels 29 permits this bodily circular motion of gears 31 while restraining the same from rotating around their axes, and this sweeping action of the gears 31 results in imparting rotation to wheels 28 at a considerable reduction from the speed of rotation of shaft 7, the particular ratio in the present case being 10 to 1. When the wheels 28 are free to rotate, they thus execute $\frac{1}{10}$ of a rotation for each single rotation of shaft 7, but normally the wheels 28 are latched against motion and the action of the eccentrics 32 on wheels 31 results in their rolling around the internal teeth 30 of wheel 28. During such rolling motion, through the links 33, the plate 34 and links 35, the wheels 29 are also caused to rotate, the direction of rotation of such wheels being in the opposite direction to the rotation of shaft 7, whereas, when wheels 29 are prevented from rotating, the wheels 28 are driven by the eccentric motion of gears 31 in the same direction as shaft 7.

It was previously mentioned that there is a 4 to 1 ratio between the shaft 7 and the motor shaft and that the motor makes 96 rotations per operation of the machine, and in the machine as herein shown, 24 rotations of said shaft 7 are therefore employed to carry the machine through one complete operation. Entering an item with this arrangement would require at most, 9, rotations of shaft 7, but since the indicators and some of the type wheels must be restored preliminary to entering an item in the machine, and since a number of transfers may at times be necessary between the totalizer elements after the item is entered, and that time must be provided for taking impressions, etc., the allowance of 24 rotations of shaft 7 is made for a fairly high capacity machine and the desired distribution of the load during its operation, permitting a comparatively smooth action of the mechanism.

The type of gearing herein employed for totalizing, involving a sweeping eccentric action of an external gear meshing with an internal gear while the external gear is prevented from rotating, is well known in many different machines, such as hoisting apparatus, etc., but in its present relationship and modified form, has a different action, since it not only brings about a desired speed reduction, but effects a differential action between the rotary elements of the totalizer.

The wheels 28 carry gears 36 constantly in mesh with gears 37 journaled on a shaft 38 and through the gears 37 the differential movements of wheels 28, when items are added or subtracted thereto, are transmitted to indicators and to item printing wheels; but through connections permitting an independent restoring of the indicators and item wheels, the gears 37 by direct gearing to another set of type wheels, serve to rotate such type wheels in unison with wheels 28, so that the latter set of type wheels are always in proper position to permit taking an impression of the total after any regular operation of the machine.

The sets of wheels 28 and 29 are properly constructed so that either the wheels 28 or the wheels 29 may be latched or released at different times in the operation of the machine, as required for entering items in the wheels 28. Either one wheel or the other of each set is held against rotation at all times, and as a consequence, regardless of the distances which wheels 28 are rotated, the sum of the unitary movements of each pair of wheels 28 and 29 is constant. This arrangement obviates any decided change in load on the driving mechanism, such as occurs in many accounting machines when the differential mechanism thereof releases or engages means for imparting different extents of movement to the accounting elements.

The present totalizer construction also permits of a very easy latching action in stopping wheels 28 and 29, since the gradual decrease in speed of one wheel will result in a corresponding gradual acceleration in the speed of its companion wheel. The wheels 28 and 29 are shown provided with races or notches 39 and 40 suitably shaped to allow for such differential speeds between the wheels when acted upon by suitably constructed latching devices therefor.

The latches 41 for controlling the totalizer may be constructed as shown in Fig. 19, and are slidable in a direction transverse to the plane of the totalizer elements in ways 42 of bearing members 43 secured to the base plate 1. The latch members are provided with upstanding lugs 44 and 45 preferably integral therewith and shaped to conform to the notches 39 and 40 in the totalizer wheels 28 and 29. The latch members are also each provided with a pair of rollers 46 and 47 engaging opposite sides of rings 48 secured to gear wheels 49 loosely journaled on shaft 7. The gears 49 are preferably provided with broad hubs 50 and are slidable for a short distance along the length of shaft 7 on collars 51 secured to the shaft. Roller bearings 51.1 are shown between the hubs 50 and collars 51. The gears 49 are driven by broad pinions 52 on shaft 8 (Figs. 3 and 14). The shaft 8 rotates upon each operation of the machine the required extent to drive the gears 49 through half of a rotation, and these gears are provided with two sets of cam members 53 and 54 at diametrically opposite points thereon.

The cam members 53 are located in the vertical planes of rollers 55 (Fig. 13) on the keys 56, when the gears 49 are in position shown in Fig. 14, and the lugs 44 of latches 41 are in engagement with notches in the wheels 28 of the totalizer. By depressing one of the keys 56, its roller 55 is projected into the path of one of the cams 53 on the gear 49, and thus upon the rotation of the gear, it is shifted to the left (Fig. 14,) upon the engagement of the cam 53 with the depressed key. This lateral movement of the gear 49 through the wheel or ring 48 carried thereby engaging roller 46 on the latch, causes the latch to be slid to the left (Fig. 15), disengaging the lug 44 from wheel 28 and engaging lug 45 with the wheel 29. When the gear 49 is thus shifted, the cams 54 thereon come into the plane of stationary restoring rollers 57 on key frames 58, and after a cam 54 has traveled from the position of the depressed key to the restoring roller, 57, the gear 49 is shifted by the latter to its former position, as shown in Fig. 15, thus again latching wheel 28 against movement and permitting the wheel 29 to rotate.

Cams 53 and 54 are suitably formed to positively force the latch members 45 and 44 respectively into the notches 40 and 39 when the cams 53 and 54 respectively engage a roller on a depressed key and the restoring roller 57. The lateral action of gears 49 is also such that one or the other of wheels 28 and 29 may be gradually brought to rest while the motion of the other wheel is accelerated from zero to its normal rate of speed. Thus, during the latching operation, both wheels may be rotating but the combined speed of the wheels never exceeds the normal rotation of one of the wheels when the other wheel is positively latched against motion. Therefore, if the resistance to rotation of the wheels 28 and 29 is equal, the stopping and starting of either wheel does not alter the constant load carried by shaft 7, and such equal resistance assists materially in effecting a smooth operation of the machine. Since in machines of this class the actual required output of mechanical work compared to their strength and the power input is so slight, such resistance may be inserted without detriment.

In the present case, this resistance to rotation of wheels 29 is provided for in steel spring washers 59, placed between the hubs 60 of the wheels 29 and the collars 51 which are securely fastened to the shaft 7. The direction of rotation of wheels 29 is always opposite to the rotation of the shaft 7.

The load carried by gear 49 in its lateral motion in shifting the latch 41 from one position to another may be relieved by mechanical means, which are herein shown as levers 61 pivoted by studs 62 on rearwardly extending arms 63 on the latch bearing members 43. The arms 63 also carry upstanding pins 64 which are in line with, and in the same transverse plane, as studs 62 and also with pins 65 on the rear ends of levers 61 when these levers are in a central position.

A comparatively strong spring 66 extends between the pins 64 and 65, and the forward ends of levers 61 are provided with one or more teeth 67 in the form of gear teeth and fitting interdentals 68 of rack formation, cut in the latches 41. The normal position of levers 61 is as shown in Fig. 19, with the springs urging them in the proper direction to hold the latch members 44 in engagement with notches in wheels 28, but when a latch 41 is shifted toward the left by action of a gear wheel 49, pin 65 is moved to a position to carry the corresponding spring to the other side of the center line passing between pins 65 and 64 and the stud 62. The spring then rocks the lever in a direction to throw the latch to the left, disengaging lug 44 from wheel 28 and engaging the lug 45 with wheel 29.

In the particular arrangement shown in the drawing, the levers 61 under the action of springs 66 merely assist the gears 49 in effecting the latching operations after these gears have caused the levers to pass center.

Transfer mechanism.

Carrying operations from totalizer wheels 28 of lower order to wheels 28 of higher order are controlled by cams 69 extending from the peripheries of wheels 28 between a pair of the notches 39 therein. These cams are shaped for the purpose of operating in either direction of rotation of the wheels 28 and coact with rollers 70 (Figs. 14 and 20) on members 71 (Fig. 21) slidably mounted between flanges 72 of the key frames and plates 73 secured thereto. The slidable members 71 are normally urged toward the wheels 28 and 29 by springs 74 compressed between lugs 75 on members 71 and the horizontally disposed flanges 76 of the key frames. The slide members 71 also have lugs 77 at their outer ends, which carry rollers 78, the same size as rollers 55 on the keys and the stationary rollers 57. The flange 72 is slotted at 79 to permit the lugs 75 and 77 to extend therethrough and not interfere with the sliding action of member 71. In the normal position of the slides 71 with the rollers 70 engaging the periphery of wheels 28 and 29, the cams 53 on gear wheels 49 pass between the rollers 78 and lugs 75 during the rotation of gears 49.

When a totalizer wheel 28 travels from 9 to 0, or from 0 to 9, the cam 69 thereon engages the rollers 70 in the key bank of next higher denominational order, shifting the corresponding slide 71 into proper position to bring its roller 78 in the path of cam 53 of the gear wheel 49 of the same denominational order. The slide 71 is held in this position by a spring-actuated pawl 80 pivoted by pin 81 on flange 72. The spring 82 for this pawl is shown extending from a slot therein and bearing against the rear edge 83 of the key frame. When the slide 71 is shifted by the action of the cam 69, roller 78 is engaged by the cam 53 of the corresponding gear wheel 49 after the cam 54 thereon has passed the stationary roller 57, and after the item represented by depressed keys is entered into the totalizer.

The wheel 49 is shifted to the left when its cam 53 engages roller 78, releasing its corresponding totalizer wheel 28 and stopping rotation of the companion wheel 29 by shifting latch 41 in the same manner as when the cam 53 engages the roller 55 of a depressed key. This action releases wheel 28 so that it can rotate the required unit of movement. The latch 41 is then restored to its original position, latching the wheel 28 after it has made the unit of movement, by cam 54 on gear wheel 49 engaging a stationary restoring roller 84, similar to the roller 57 and in the same vertical plane.

The transfer devices for the different denominations represented in the machine are suitably located with respect to the value keys of their corresponding banks, to provide a time interval between the entering of an item in the totalizer and the carrying operation, in order that the indicators and item type wheels may be alined in position to indicate and print the item, and be disengaged from their driving connections with the totalizer, before the carrying operation takes place.

The transfer devices for the various denominations may be helically spaced around the totalizer to take care of a succession of transfers, as is sometimes necessary, although in the present machine it is preferred to have the gears 49 so arranged that their cams 53 and 54 are in a helical line with respect to the axis of the totalizer, and if this is the case, the transfer devices may all be similarly located on their respective key banks, since the cams 53 and 54 of the lower order wheels 49 may then operate in advance of the cams 53 and 54 of the higher order wheels. It is also desirable to offset the cams of wheels 49 fractional units, so that all of them cannot be operating at the same moment.

The slide members 71 are permitted to return to their normal position under the action of springs 74 when studs 85 (Figs. 3, 15 and 16) carried by gear wheels 49 engage the noses 86 of latches 80, causing the same to release slides 71. The ends 87 of latches 80 normally bear against the edges of lugs 77 on the slide members.

Keys and key-coupler.

The drawings show four banks of keys while there are six denominational elements in the totalizer. The corresponding key frames 58 for the two highest elements of the totalizer are not provided with keys and support transfer devices only. Thus, the two higher order elements of the totalizer are controlled entirely through the carrying mechanism.

The keys 56 (Figs. 3, 14 and 20) are slidably mounted in the flanges 76 and 88 in the key frames 58. The keys are normally held in their outer position by springs 89 encircling their shanks and compressed between the flanges 76 of the key frames, and pins 90 passing through the shanks of the keys and slidable in slots 91 (Fig. 10) in the vertical web 92 of the key frames. These slots prevent the keys from turning around their axes.

The pins 90 also extend beyond the webs 92 over the outer edges 93 of key detents 94 slidably mounted on headed pins 95 extending from the side of the key frames. These pins pass through slots 96 in the key detents. At their upper ends, the key detents have a slot and pin connection with arms 97 rigid on shaft 98 journaled in the ears 99 of the key frames. Each detent 94 has nine slots 100 inclined with respect to the direction of movement of the keys and having their open ends normally in such position that when a key is depressed, its pin 90 will enter a corresponding slot in a detent and force the same downwardly. Since the detent-carrying arms 97 are all rigid on shaft 98, they cannot operate independently of each other and therefore, if an amount involving two or more numbers is entered in the machine, it is necessary to simultaneously depress the keys representing such amount. Since a depression of a key through its respective detent causes shaft 98 to rock forward, the detents will move so that the open ends of slots 100 do not register with the pins 90 on the keys and therefore lock the remaining keys against depression.

Also rigid on shaft 98 is a member 101 in the form of a bell crank, the upright arm 102 of which normally serves as a dog for retaining a vertically slidable link 103 in its upper position.

The remaining arm 104 carries a roller 105 for coöperating with the recessed periphery 106 of a wheel 107 journaled on shaft 7 and driven independently thereof in the direction indicated by the arrow (Fig. 10) by a gear 108 rigid on shaft 8, through an intermediate gear 109 meshing with gear 108, and a gear 110 rigid with wheel 107.

The dog 102 normally engages a shoulder 111 on link 103 and the link is normally urged to slide downward, as guided by a slot in a fixed frame member 116, and in tracks provided by the guide member 112 (Fig. 13) secured to the key frame for the bank of keys of lowest order. The link 103 is normally urged to move downwardly by a spring 113 extended from the base plate 1 to an arm 114 pivotally mounted between the upstanding arms 115 of frame 116 secured to the base plate 1. The link 103 carries a pin 117 at its lower end extending below the arm 114. Thus, the downward motion of arm 114 may be communicated to link 103 when the latter is released by the depression of keys. The link 103 operates a switch 118 for controlling the motor circuit.

Upon the depression of a key or combination of keys, the detents 94 are forced downwardly, thus rocking shaft 98 in proper direction to withdraw pawl 102 from engagement with the link 103, which then moves downwardly under the action of spring 113 in causing arm 114 to bear against pin 117 on the link. By this means, the motor is started and rotation of shaft 8 results in driving the wheel 107 in the direction indicated by the arrow in Fig. 10. The inclined surface 119 of a recess 120 in the periphery of wheel 107 (Fig. 13) acts upon the roller 105, causing a further rotation of member 101 and shaft 98 in the same direction as when a key is depressed. The keys may be depressed but a slight distance before releasing link 103, and as the motor circuit is at once closed by movement of this link, and the inclined surface 119 of wheel 107 at once acts on roller 105, all the detents 94 are forced downwardly, thus causing the inclined slots 100 to acts on key pins 90 of depressed keys, forcing such keys to their fully depressed positions.

This arrangement of key mechanism permits the control of the machine by a very slight effort upon the part of the operator, since the sole work performed in the initial depression of keys is to give a slight movement to detents 94, thus coupling the depressed keys together and locking out the remaining keys and withdrawing the dog from shoulder 111.

The slide 103 is restored to its normal position near the end of an operation of the machine by cam 121, secured to wheel 7 in the proper place to act upon a roller 122 on slide 103, and lift the slide to a position where it may be latched by dog 102, and the dog is permitted to return to latching position when recess 120 arrives opposite roller 105, which action takes place a moment before cam 121 passes clear of the roller 122.

The rocking of member 101 and shaft 98 and the cam action of detents 94 on the keys, under the action of the cam surface 119, takes place against the action of springs 123, Fig. 1, coiled around shaft 98. These springs thus serve to reëngage the dog 102 with shoulder 111 when the recess 120 on wheel 107 arrives opposite the roller 105.

Machine stop.

The wheel 107 carries a roller 124 which, when it is in its normal position as shown in Fig. 10, is between a plunger 125 slidably mounted in the arm 114 and shoulder 126 on an arm 127, pivoted by a short shaft 128 in frame 116. The part 129 of arm 127 is off-set from the remainder of the arm to permit the arm 114 to rock downwardly without interference, and the end 130 of arm 127 is extended upwardly and shaped to be engaged by roller 124 when the same nears its normal position at completions of operations of the machine. Thus, the arm 127 would be engaged and rocked downwardly at such time. The downward movement of arm 127 is opposed by a spring 131 extended between a rod 132 in a frame 133, and an adjusting device 134 secured to one end of a brake-band 135, which partly encircles a brake wheel 136 secured to shaft 7. The remaining end of the brake-band is secured to an arm 137 rigid on shaft 128. When arm 127 is engaged and rocked downwardly by roller 124, shaft 128 is rocked, and through arm 137 draws downwardly on the brake-band, thus causing it to grip brake wheel 136 according to the tension of spring 131. The tension of this spring may be regulated by the nuts 138 threaded to the member 134 and bearing against the upper end of the frame 133.

After roller 124 passes over the edge 139 of arm 127, it permits the arm to return to its normal position and also may engage the plunger 125, forcing the same inwardly against the action of a spring 140 mounted in a recess in arm 114 in back of the plunger 125. The plunger 125, therefore, serves for finally cushioning the mechanism as it comes to rest.

Indicators.

The indicators 141 (Figs. 22 and 23) are rotatably mounted on a shaft 142 journaled in the frames 2 and also supported by depending extensions 143 of the frame member 3. Rigid with the indicators are gears 144 meshing with gears 145 journaled on shaft 38, which is also supported in the frames 2. Beside each gear 145 is a similar gear 37 meshing with a gear 36 rigid with a totalizer wheel 28. Accordingly all motions of the totalizer wheels 28 either forward or backward, and while transferring, are communicated to the set of wheels 37. Since it is desired to transmit items only to the item indicators, means are provided for coupling together the sets of gears 145 and 37 only during the time that the wheels 28 are rotated under the control of the value keys.

This means for coupling the gears 145 and 37 consists of a plurality of broad pinions 148 journaled on a rod 149 which is carried by arms 150 fast to a rocker shaft 151. Each broad pinion may mesh with a pair of the gears 145 and 37 and serve to communicate motion from the gear 37 to the gear 145, from which the motion is transmitted to the corresponding indicator. The shaft 151 is rocked as required, by a box cam 152 formed on mutilated gear 170 (Fig. 22). The race 154 of box cam 152 acts upon a roller 155 pivoted to an arm 156 rigidly secured to shaft 151. The box cam 152 serves to engage the broad pinions with the gears 145 and 147 before any of the controlling cams 53 (Fig. 14) of the wheels 49 engage depressed keys, and the broad pinions are disengaged right after cams 53 pass restoring rollers 57 and before the transfer operation takes place. In their disengaged position the pinions 148 are alined by teeth 147 on frame 196.

The indicators are alined and released at the proper times by alining pawls 157 pivoted on shaft 38 and arranged to enter alining notches 158 in the indicator drums. The edges of these notches are beveled to suit the V-shaped noses of pawls 157. The pawls are rocked into engagement with the indicator drums by cam 159 rigid with the box cam 152. The high part 160 of cam 159 serves to hold the alining pawls 157 in engagement with the indicators after the same have been properly set to indicate items. The part 161 of the cam serves to hold aliners in engagement with the indicators during the time that the broad pinions 148 are rocked into engagement with the gears 145 and 37 after the indicators have been restored at the beginning of operations of the machine.

Cam 159 acts upon a roller 162 carried by a lever 163 fast on shaft 153 and connected by a link 164 to an arm 165 rigid with shaft 166. This shaft is journaled in the frames 2 and carries fast thereon a plurality of arms 167, each having a pin 168 extending through a slot in the outer ends of the pawls 157. When the lever 163 is rocked by cam 159, the link is forced upwardly, causing shaft 166 to be rocked, and through the arms 167 and pins 168 cams the alining pawls 157 into engagement with the indicators. A coiled spring 169 serves to withdraw the alining pawls from the indicators when roller 162 is released by cam 159.

The indicators are reset at the beginning of operations of the machine by a mutilated gear 170 rigid with the cam 152, and adapted during the single rotation of said gear to cause one rotation of a gear 171 journaled on a stub shaft 172 and meshing with a gear 173 journaled on a stub shaft 174. The gear 173 in turn meshes with a gear 175 fast to the indicator-supporting shaft 142. Secured to this shaft is an arm 176 located within each indicator drum at the right of hubs 177 of these drums (Fig. 23). Slidably mounted in recesses 178 in arms 176 are pawls 179 normally urged toward shaft 142 by springs 180 extended between eyes 181 at the bottom of the pawls and pins 182 on arms 176. The pawls 179 carry pins 183 extending through slots 184 in arms 176 and at their outer ends resting in notches 185 in disks 186 rigid with the depending arms 143 in the frame member 3. The outer ends of pawls 179 are provided with shoulders 187 for engagement with square pins 188 on spokes 189 of the indicators.

When the pawls 187 are in their lower positions, the indicators may rotate in either direction without pins 188 engaging the pawls, but when shaft 142 is rotated by the action of mutilated gear 170, the pins 183 on the pawls ride upwardly on the inclined edges 190 on disks 186 and are thereby projected into position to engage the pins 188 during the rotation of shaft 142. In this manner the indicators are rotated to their zero position from whatever position they may have been left in after the preceding operation of the machine.

A pin 188 is shown in the zero position in Fig. 22. When it arrives in such position under the action of a pawl 176, the pin 183 of the pawl arrives opposite the recess 185 in disk 186, and the pawl is drawn to its inner position by spring 180. This indicator restoring device permits the indicators to rotate in either direction to indicate amounts of addition or subtraction, and in whatever position the indicators may be set, the restoring mechanism serves to rotate them in the direction indicated by the arrow in Fig. 22 around to zero position, at which point they are alined by the aliners 157. The comparatively long alining recesses 158 in the indicators permit the noses of the pawls to enter said notches while the indicators approach the zero position.

In order that one set of indicators may be used for indicating both added and subtracted amounts while the same are rotated in opposite directions upon additions and subtractions, the indicators are made extra wide and provided with two sets of numbers arranged as shown in Fig. 1, and the indicator screen 191 is longitudinally shiftable for the purpose of bringing its sight openings 192 into registry with either set of numbers on the wheels.

The indicator screen 191 (Figs. 1 and 11) is journaled on shaft 142, and feathered to the hub of the indicator screen is an arm 193 having a slot and pin connection with a plunger 194. The plunger 194 is slidably mounted in an ear 195 of tie-bar 196, to which the upper ends of the key frames are secured, and has a limited downward movement under the action of a spring 197. A roller 198 pivoted to the bottom of plunger 194 normally engages the outer surface of cam 121, but as this cam passes away from the roller during the operation of the machine, the indicator screen 191 rocks downward to screen the indicators while the same are being restored to zero and rotated to new positions. Near the end of the operation of the machine, cam 121 forces the plunger 194 upward, thus bringing the openings 192 in the indicator screen in registry with the desired numbers on the indicator.

Figs. 1 and 2 show mechanism whereby the indicator screen is shifted longitudinally of shaft 142 to bring the openings 192 therein in line with the set of numbers on the indicator which are employed for indicating subtracted amounts. In these figures, the lever 11 which operates the reverse gearing for shaft 7 is shown connected by a link 199 to an arm 200 journaled on a sleeve 201 rigid with hub 202 of the screen 191. The arm 200 has an inclined slot 203 through which projects a pin 204 secured to sleeve 201, a construction similar to that shown in Fig. 9. When the lever 11 is rocked downwardly to the subtracting position, link 199 is drawn downward, thus rocking the arm 200 and causing its inclined slot to engage pin 204 and shift sleeve 201 and the screen 191 to the position where its openings 192 will register with the indicator numbers for indicating subtracted amounts.

*Printing devices.*

The drawings show the machine as equipped with two sets of type wheels which are arranged for printing added or subtracted items and totals on the detail strip and on a receipt strip or inserted slip. The type wheels 205 (Figs. 1, 25 and 26) are employed for printing totals and each is rigid with a gear 206 meshing with gears 207, in turn meshing with a pinion 208 fast on a sleeve 209, surrounding one shaft of the row of shafts 210. These sleeves also carry fast thereon pinions 211 (Fig. 3), meshing with the gears 37, which as previously mentioned, also mesh with the gears 36 rigid with the totalizer wheels 28. By this gear connection, the type wheels 205 always rotate with the totalizer wheels 28, and an impression of the total may therefore be obtained after any entry in the machine without requiring any other operation of the mechanism thereof than the releasing of total printing platens 212 and 213 (Figs. 25 to 28).

The platens are loosely journaled on shafts 214 and 215 supported in bearings in the side frames 2 and a bearing member 216 (Fig. 25) mounted on base 1. The platens 212 and 213 are linked together by links 217 and 218, which are respectively pivoted at their outer ends to platen arm 219 of the platen 212 and a rearwardly extending arm 220 of platen 213. The inner ends of the links 217 and 218 are pivoted by pin 221 to a lever 222 (Fig. 25) journaled on shaft 224, also supported in the side frames 2. The lever 222 is urged by a spring 223 to rock in the proper direction to cause the platens 212 and 213 to rock toward the type wheels for the purpose of making impressions. This action is normally prevented by an arm 225 (Fig. 27) carried by the oscillating drum 226 of a lock 227. The arm 225 is normally engaged by a spring-pressed plunger 228 slidably mounted in a boss 229 on platen 213, but when a key is inserted in the lock 227, the arm 225 is rocked upwardly out of the path of plunger 228. The platens are operated under the action of spring 223 and may effect the desired impressions of the total on an inserted slip at rest on table 230 between the platen 212 and the type wheels, and on a detail strip 231 (Fig. 30) which is caused to travel between the platen 213 and the type wheels over a writing table 232 (Fig. 25).

Means for feeding the detail strip and inking ribbons 233 and 234 are omitted from the drawings. Motion of the platens toward the type wheels is limited in the usual manner, actual impressions being effected by slight resiliency in the platens which permits them to spring slightly beyond their limited position and to return to such position spaced from the type wheels.

Cam 235 fast to a rotating shaft 236 serves to restore platens 212 and 213 to normal position. This cam acts upon a roller 237 on lever 222, and through this lever and the links rocks the platens back to normal position, in which position they are latched by the spring plunger 228 engaging arm 225 of the lock. Shaft 236 is rotated upon operations of the machine by a gear 238 fast thereon and in position to be engaged by the mutilated gear 170 (Fig. 22).

The arm 225 is rigid with an arm 239 bent to extend through a slot 240 in side frame 2 (Fig. 22), and provided with a lug 241 for coöperating with an arm 242 rigid with the key detent shaft 98. Accordingly, when the key of lock 227 is removed, the machine may be operated as usual. The arm 242 on the key detent shaft 98 also assumes a position with respect to lug 241 while the machine is operating to prevent operation of the lock at such time.

The set of detail type wheels 243 are rigid with a set of gears 244 which mesh with gears 245 loose on shaft 38 and meshing with a set of pinions 246 rigid on shafts 210. These shafts also carry rigid thereon a set of pinions 247 (Fig. 14) meshing with the gears 145 which are loose on the shaft and at the side of gears 37 which engage the gears 36 carried by the totalizer wheels 28 (Figs. 22 and 23). Since the gears 145 and 37 are coupled together by broad pinions 149 during the time that items are added or subtracted, the item type wheels 243 are set so that impressions indicating such items may be made.

The detail type wheels 243 are provided with four sets of type in order that added or subtracted items may be printed on the detail strip or on an inserted slip or check. As shown in Fig. 27, the type 248 for printing added and subtracted items on the detail strip is the same height as the type on the set of wheels 205 for printing totals, whereas the type 249 for printing items on the check or inserted sales slip is preferably much larger. As appears in Fig. 30, it may be seen that one set 250 of items on the detail strip are offset from the set 251, and are preferably in italics, while the set 251 are in plain Gothic type. In this manner, the subtracted amounts as represented by the set of items 250 on the detail strip may be distinguished from the added items 251.

The platens 252 and 253 (Figs. 27 and 28) are shiftable laterally of the type wheels for the purpose of being positioned to effect impressions from either the adding or subtracting set of type. For the same reason, the platens are provided with a plurality of inserts 254 extending above their surfaces 255. By shifting the platens, the inserts may be brought into line with either set of type. The means for so shifting the platens are under the control of reverse lever 11 (Fig. 2) so that when this lever is shifted to the subtracted position, the platens will also be properly shifted. The connection between the lever and platen comprises a link 256 pivoted at one end to lever 11 and at its opposite end to an arm 257 (Fig. 9) journaled on shaft 214, and having an inclined slot 258 which is engaged by the pin 259 on shaft 214. Thus, when lever 11 is shifted, arm 257 is rocked and through its cam slot 258 engaging pin 259, shifts shaft 214 in the direction of its length. This shaft is prevented from rotating as shown in Fig. 9 and is provided with notches 260 and 261 (Fig. 28) for respectively engaging the toothed ends 262 of platen 252 and a lever 263. This lever is pivoted on a stud 264 (Fig. 25) midway of its length and at its upper end engages a notch 265 in platen 253, which is slidable along the shaft 214.

The platen 253 comprises a frame 266 pivotally mounted on a stud 267 carried by the platen-supporting arm 268. When the lever 11 is shifted, causing the longitudinal movement of shaft 214, the latter at notch 260 engages the extension 262 of the platen carrying frame 266, shifting the platen as desired. The shaft 214 by engaging the lever 263 at the notch 261, rocks the same as desired, for shifting the platen 252.

The platen carrying frame 266 is engaged by a spring 269 (Fig. 1) coiled round shaft 214 and urged thereby toward the type wheels, as required for effecting impressions. The action of this spring is controlled by cam 235 fast on rotating shaft 236 and which coöperates with a roller 270 carried by the upwardly extending arm 271 on the platen carrying frame 266.

One of cams 235 is also suitably formed to engage a roller 272 (Fig. 25) on a lever 273 journaled on shaft 224. This lever is connected by a link 274 to a rearwardly extending arm 275 on platen 252, and when acted upon by cam 235, serves to tension a spring 276 for operating platen 252. The time of action of platens 252 and 253 is determined by the position and shape of cam 235 on shaft 236 and the time of rotation of this shaft. The impressions take place when the high point of the cam clears the rollers 270 and 237.

Since the item type wheels rotate in opposite directions from their zero position respectively, when positioned for printing added or subtracted items, it is necessary to arrange the type on the wheels accordingly. Thus, the ciphers thereon are in line, while the nines and ones are at the side of each other, etc., as appears in Fig. 26.

The item type wheels 248 are alined by a multi-pronged pawl 277, (Fig. 25) engaging notches 278 in the type wheels. Pawl 277 is rigid on shaft 153 which is rocked as required by cam 159 (Fig. 22). The total type wheels 205 are alined by a similar pawl 279 engaging notches 280 in said wheels. The pawl 279 is loosely supported by shaft 153 and operated by arm 281 (Fig. 22) fast to the pawl and engaged by cam 283 when the machine is at rest.

*Operation.*

In the machine shown in the drawings, the banks of keys are close together. For this reason the key-coupling device may be employed as shown, in order to shorten the time required in effecting operations of the machine. When key-boards of much higher capacity are required than is shown in the present case, it would be preferable to arrange for the successive depression of keys by permitting slight independent action between the key detents or coupling devices.

Figure 6:
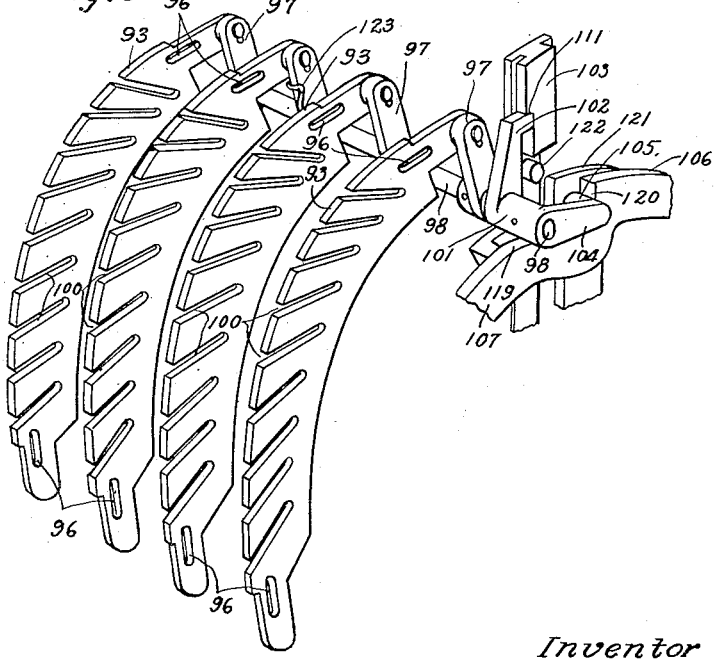
Fig. 6 is a detail in perspective of the key-coupling device.

As the machine is shown, an item may be entered therein by simultaneously depressing the required combination of keys. This serves to rock the key detent shaft 98, shown in Fig. 6, releasing the slide member 103, and closing the motor switch 118 (Fig. 10), while slide 103 moves in front of the nose of pawl 102 on shaft 98, preventing the return of the depressed keys. The closing of the motor circuit results in an immediate rotation of drive shafts 7 and 8. The wheel 107

(Fig. 10), at once starts to rotate in the direction indicated by the arrow in this figure.

The cam surface 119 on the wheel engages roller 105, causing a further rocking of shaft 98 and the downward movement of the detents 93. The inclined slots 100 in the detents, by operating on the pins 90 of the depressed keys, draw the keys inwardly to their fully depressed positions. The rollers 55 thereon are suitably centered with respect to the line of movement of cams 54 (Fig. 15) on the gears 49. Cams 54 have considerable idle movement before engaging the depressed keys, and during such idle movement the alining pawls 157 (Fig. 22) are withdrawn from the indicators, and the alining pawls 277 are disengaged from the item printing type wheels 205. The indicators and item type wheels are then reset to zero by the single rotation of shaft 142 (Fig. 22) through its connections with the mutilated gear 170. The indicators and type wheels are then alined in zero positions, after which the broad pinions 149 are rocked into engagement with the pairs of gears 147 and 37, thus coupling the indicators and item type wheels with the totalizer wheels 28.

After such coupling operation, the cams 54 on wheels 49 arrive opposite the "9" keys which are the uppermost keys in the several banks. If one of these keys is depressed, engagement of cam 54 therewith results in lateral movement of gear 49, at such time causing the latch member 41 to be shifted to the left (Fig. 15), latching wheel 29 while releasing the wheel 28. If a key of lower value is depressed, this latching action is delayed until the cam 54 arrives opposite such key. As soon as wheel 28 is released and the wheel 29 latched, the external gears 31 (Fig. 17) no longer idly roll within the internal gears 30, as was the case previous to the shifting of the latch, but are held against rotation through their link connections with the wheels 29 and therefore, under the action of the eccentrics 32 are bodily carried around shaft 7 without rotating, causing a movement of wheels 28 at a considerable reduction from the speed of rotation of shaft 7, the reduction being 10 to 1 in the present instance. Thus, one rotation of shaft 7 is equivalent to one unit of movement of the totalizer wheel 28.

These wheels being geared to the gears 37 (Fig. 23) communicate their movement through the broad pinions 149 to the gears 145, the latter as previously explained, meshing with the gears rigid with the indicators, and also having gear connections to the item type wheels, rotate the indicator wheels according to the movement imparted to wheels 28. The gears 37 also having gear connections to the total printing type wheels 205, impart the movement which is added or subtracted to the wheels 28 to the total printing type wheels. When the cams 53 and gear wheels 49 (Fig. 14) engage the stationary rollers 57, gear wheels 49 are moved laterally to their original positions, thus again engaging the latch 41 with the wheels 28 and releasing wheels 29. The indicators and item type wheels are then alined in their set positions, and the broad pinions 148 are disengaged from gears 145 and 37.

If, during the time an item is being entered in the totalizer, one of the cams 69 on the wheels 28 engages roller 70 (Figs. 20 and 21) on the slide 71, the latter is forced inwardly to such position that the roller 72 carried thereon is brought into the path of movement of the corresponding cam 54. If such is the case, after the restoring of the corresponding latch 41 occurs under the action of restoring roller 57, the latch will again be shifted to release its wheel 28 the required length of time to permit it to rotate one unit of movement, and in this manner effect the desired transfer.

Stationary roller 84 is then engaged by cam 53, resulting in the return lateral movement of gear 49 and the restoring of latch 41 to its original position with wheel 28 locked and the wheel 29 free to rotate during the remainder of the operation of the machine. For each 7½ degrees of movement of gear wheel 49, either the wheel 28 or wheel 29 of each of the totalizer elements rotates respectively 36 degrees or 40 degrees, whereas the drive shaft 7 makes a complete rotation at the same time. The motion of gear wheels 49 and the totalizer elements is therefore comparatively slow and permits the latches 41 to have an easy and certain action, particularly in view of the fact that at the time of latching, one of the wheels of the pair gradually comes to rest, while the other is accelerated from zero to its normal speed. Therefore, during latching operations, the combined speed of wheels 28 and 29 is only one-half of the normal speed thereof, which is respectively 1/10 and 1/9 to 1 of shaft 7.

During or after the carrying operation is performed, the impression from the item type wheels may be taken. After the carrying operation, the total type wheels are alined. An impression of the total may be taken therefrom after the machine comes to rest, by inserting a key in lock 227 (Fig. 27), rocking the arm 225 out of the path of the spring-pressed plunger 228 carried by platen 212, which then, together with the platen 220 with which it is linked, operates under spring action to effect impressions respectively on the detail strip and either a receipt strip or inserted slip. Platens 212 and 220 are restored to normal position upon the next operation of the machine through the action of cam 225 (Fig. 25).

If it is desired to subtract an amount from the totalizer, the normal direction of rotation of shaft 7 (Fig. 7) is reversed by rocking arm 11 downwardly, and thereby reversing the gear connection between shaft 7 and the motor. The lever 11 is preferably under the control of a lock, as shown, so that it can not be retained in the subtracting position, except when the lock is turned. Since it is necessary to restore the lock to normal position in order to withdraw the key, the lever 11 may remain in its subtracting position only while the key is in the lock. If the key is withdrawn, the lever is released, returning to its normal position under the action of spring 11.1.

In the above described machine some mechanisms usual in cash registers are not desired. No paid-out totalizer is provided, for the reason that the machine is intended for use in connection with checking accounts. Bank deposits are recorded on the detail strip and the amounts thereof subtracted from the main totalizer. In this way it is possible to always have the reading of the totalizer correspond with the amount of received cash or checks still in the cash drawer.

The key-coupling device may coöperate with keys of various classes without change in its design. If it is desired to ascertain the total in any department, the various department items appearing on the detail strip may be added together by entering the amounts thereof in the totalizer after the same has been cleared. The speed of the machine and the key action makes the device suitable for listing purposes.

One of the distinctive features of this machine is that its mechanism is reversible in its operation. No special carrying devices or totalizer shifting mechanism are necessary to effect subtracting operations.

Another characteristic feature of this machine is that it is both key-controlled and key-coupled enabling the machine to do the same work which is ordinarily performed by key-controlled machines, while requiring less effort on the part of the operator in making entries in the machine, and also not requiring that the keys be depressed in some predetermined order or requiring interlocking devices between keys of different classes.

Although but one specific embodiment of this invention has been herein shown and described, it will be understood that numerous details of the construction shown may be altered or omitted without departing from the spirit of this invention as defined by the following claims.

I claim:—

1. In a machine of the class described, the combination with an accounting mechanism, of means for differentially driving the same, said means comprising intermeshing internal and external gears, means for imparting eccentric motion to one of said gears, value determining manipulative means, and means under the control of said manipulative means for differentially restraining the rotation of one of said gears around its axis.

2. An accounting mechanism, comprising a plurality of denominational elements, each of said elements including a pair of rotatable wheels, a drive shaft, differential mechanism between said wheels arranged to be driven by said shaft, means operating between the wheels of each pair for restraining the motion of one or the other of said wheels, and denominationally arranged manipulative devices for controlling said means.

3. An accounting mechanism, comprising a plurality of denominational elements, each of said elements including a pair of rotatable wheels, a drive shaft, differential mechanism between said wheels arranged to be driven by said shaft, a latch adapted to restrain the motion of one or the other of said wheels, manipulative devices for controlling said latch, and means under the control of said wheels for shifting said latch for the purpose of effecting carrying operations.

4. In a machine of the class described, an accounting device comprising a plurality of denominationally arranged rotatably mounted accounting wheels, a second set of rotatable wheels each of which is geared to one of said accounting wheels by a continuously rotatable differential gearing, means for driving said differential gearing, latching devices coöperating with the pairs of wheels for controlling their relative rotations, and denominationally arranged manipulative devices for controlling said latching devices.

5. In a machine of the class described, an accounting device comprising a plurality of denominationally arranged rotatably mounted accounting wheels, a second set of rotatable wheels each of which is geared by a differential gearing to one of said accounting wheels, means for driving said differential gearing, latching devices coöperating with the pairs of wheels for controlling their relative rotations, denominationally arranged manipulative devices for controlling said latching devices, and carrying mechanism operated by said accounting device and arranged to also control the operation of said latching devices.

6. In a machine of the class described, the combination of a totalizer comprising a plurality of denominational elements, a drive shaft, each denominational element of said totalizer being provided with a driving connection with said drive shaft, said connections each including eccentric speed reducing gears, and means for differentially controlling said totalizer.

7. In a machine of the class described, the combination of a drive shaft, an accounting mechanism comprising a plurality of denominational elements, each of said elements including eccentric differential and speed reducing mechanism arranged to be driven by said shaft, and means for differentially controlling said accounting mechanism.

8. In a machine of the class described, the combination of a drive shaft, a motor for rotating said shaft, means arranged to connect said motor with said drive shaft for causing said shaft to be driven reversely from its normal direction of rotation, an accounting mechanism comprising a plurality of denominational elements, each of said elements including eccentric differential and speed reducing mechanism arranged to be driven by said shaft, and means for differentially controlling said accounting mechanism.

9. An accounting mechanism, comprising a pair of rotatably mounted wheels, differential mechanism connecting said wheels, means for driving said differential mechanism, means for locking one or the other of said wheels in different angular positions, a driven member, said member having connections for controlling said means for locking one or the other of said wheels, and denominational manipulative devices arranged to regulate the action of said connections.

10. In a machine of the class described, the combination with a motor and shaft driven thereby, of an accounting device comprising a plurality of rotatably mounted wheels, an internal gear carried by each of said wheels, a plurality of eccentrics carried by said shaft, external gears journaled on said eccentrics and meshing with said internal gears, means for restraining or permitting said external gears to rotate when the same are revolved by the action of said eccentrics, and denominationally arranged manipulative devices for controlling said means.

11. In a machine of the class described, the combination of a motor, a shaft driven thereby, denominationally arranged manipulative devices, and an accounting mechanism comprising a plurality of eccentrics carried by said shaft, external gears journaled on said eccentrics, wheels provided with internal gears meshing with said external gears, a second set of wheels journaled on said shaft and having connections with said external gears compelling said second set of wheels to rotate with said external gears while permitting the latter to have an independent eccentric movement around said shaft, a plurality of oppositely formed races in both sets of said wheels, and latches under the control of said manipulative devices arranged to engage the races in one or the other of said sets of wheels.

12. An accounting mechanism, comprising a pair of rotatably mounted wheels, differential mechanism connecting said wheels, means for driving said differential mechanism, means for locking one or the other of said wheels in different angular positions, a driven gear, said gear having connections for controlling said means, and depressible keys arranged to regulate the action of said connections.

13. In a machine of the class described, the combination of an accounting device, driving and controlling mechanism therefor, manipulative means for controlling said mechanism, a motor for driving said mechanism, a reduction gearing arranged to transmit motion between said motor and said mechanism and comprising a pair of intermeshing internal and external gears, and means driven by the motor for imparting an eccentric motion to one of said gears.

14. In an accounting machine, the combination of accounting mechanism comprising a plurality of rotatably mounted wheels, differential mechanism connecting said wheels together in pairs, latching devices coöperating with said wheels to control the differential action between the several pairs of wheels, and manipulative devices, said manipulative devices being arranged to control the action of said latching devices.

15. In a machine of the class described, the combination of a pair of drive shafts, a motor with connections for driving said shafts in a predetermined ratio, an accounting device, means operated by one of said shafts for driving said accounting device, and denominationally arranged controllers driven by the remaining shaft for controlling said means for driving said accounting device, and denominational manipulative devices arranged for controlling the action of said controllers.

16. In a machine of the class described, the combination with a motor, of a pair of drive shafts driven thereby, gear connections between the motor and one of said shafts whereby the direction of rotation of said shaft may be reversed, an accounting device connected to be driven by said reversible shaft, and means operated by the remaining shaft for controlling the action of said accounting device.

17. In a machine of the class described, the combination with a motor, of a pair of drive shafts driven thereby, gear connections between the motor and one of said shafts whereby the direction of rotation of said shaft may be reversed, an accounting device connected to be driven by said reversible shaft, means operated by the remaining shaft for controlling the action of said accounting device, and manipulative devices for controlling said means.

18. In a machine of the class described, an accounting mechanism comprising a plurality of denominational elements, each of said elements including one of a set of internal gears intermeshing with a set of external gears, eccentrics supporting one of said sets of gears, and means under the control of said accounting mechanism for rotating said eccentrics for the purpose of effecting carrying operations from one denominational element to another of said accounting devices.

19. In a machine of the class described, the combination of an accounting device, driving and controlling mechanism therefor, manipulative means for controlling said mechanism, a motor for driving said mechanism, a reduction gearing between said motor and said mechanism, comprising a pair of intermeshing internal and external gears, means driven by the motor for imparting an eccentric motion to one of said gears, and means for restraining axial rotation of said gear, the remaining gear being arranged to drive said mechanism.

20. In a machine of the class described, the combination of accounting mechanism, comprising a plurality of denominational pairs of rotary elements, differential mechanism connecting the elements of each pair, means for driving said differential mechanism, denominationally arranged manipulative devices, and latches for preventing the rotation of one or the other of the rotary elements of each pair, said latches being under the control of said manipulative devices.

21. In a machine of the class described, the combination of accounting mechanism, comprising a plurality of denominational pairs of rotary elements, differential mechanism connecting the elements of each pair, means for driving said differential mechanism, and controlling devices for causing the differential mechanism to effect differential rotation between the rotary members of each denominational pair of said members.

22. In an accounting machine, the combination of accounting mechanism comprising a plurality of denominational pairs of rotatable wheels, differential mechanism between each pair of wheels, means for operating said differential mechanism, manipulative devices, and transfer mechanism, said manipulative devices and transfer mechanism being each arranged to control the action of said differential mechanism.

23. In an accounting machine, the combination of accounting mechanism comprising a plurality of rotatably mounted wheels, differential mechanism connecting said wheels together in pairs, latching devices coöperating with said wheels to control the differential action between the several pairs of wheels, manipulative devices, and transfer mechanism, said manipulative devices and transfer mechanism being arranged to control the action of said latching devices.

24. In an accounting machine, the combination of accounting mechanism comprising a plurality of rotatably mounted wheels, differential mechanism connecting said wheels together in pairs, latching devices coöperating with said wheels to control the differential action between the several pairs of wheels, manipulative devices, transfer mechanism, said manipulative devices and transfer mechanism being arranged to control the action of said latching devices, and means for driving said differential mechanism forwardly and backwardly.

25. In a machine of the class described, the combination of accounting mechanism, comprising a plurality of denominational pairs of rotary elements, differential mechanism connecting the elements of each pair, reversible means for driving said differential mechanism, denominationally arranged manipulative devices, and latches for preventing the rotation of one or the other of the rotary elements of each pair, said latches being under the control of said manipulative devices.

26. In a machine of the class described, the combination of accounting mechanism, means for differentially driving the same, a plurality of banks of keys arranged for controlling said differential mechanism, key-coupling devices arranged to be given a preliminary movement by the depression of keys, driving mechanism, means under the control of said driving mechanism for imparting a further movement to the key-coupling devices, said key-coupling devices being arranged to draw the keys to their fully depressed positions by said further movement thereof, a motor having connections for driving said driving mechanism, and a switch controlling the operation of said motor, said key-coupling device having connections for operating said switch.

27. In a machine of the class described, the combination of accounting mechanism, differential mechanism for operating said accounting mechanism, a plurality of banks of depressible keys for controlling said differential mechanism, a key detent for each bank of keys, a rocker shaft connected to move in unison with said detents, a motor for driving the differential mechanism, and circuit connections for said motor under the control of said rocker shaft.

28. In a machine of the class described, the combination of accounting mechanism, differential mechanism for operating said accounting mechanism, a plurality of banks of depressible keys for controlling said differential mechanism, a key detent for each bank of keys, a rocker shaft connected to move in unison with said detents, a motor for driving the differential mechanism, circuit connections for said motor under the control of said rocker shaft, and means driven by said motor for rocking said rocker shaft and thereby causing said detents to draw keys engaged therewith into their fully depressed positions.

29. An accounting mechanism, comprising a plurality of pairs of rotatable wheels, differential mechanism connecting the wheels of each pair, means for controlling the relative rotation of each pair of wheels, said means comprising shiftable latch members which may engage and stop the rotation of either wheel of a pair, springs arranged with respect to said latches for the purpose of moving them from one side or the other of a middle position with respect to the corresponding pairs of wheels, and manipulative devices having connections for controlling the action of said springs.

30. In a machine of the class described, the combination of accounting mechanism, means for differentially operating the same, driven members movable laterally of their normal plane of motion, said members being arranged to control said means by their lateral motion, manipulative devices arranged to control the lateral motion of said members in one direction, and stationary stops for restoring said members.

31. In a machine of the class described, the combination of accounting mechanism, means for differentially operating the same, driven members for controlling said means, keys arranged in banks for controlling the action of said members in one direction, stationary stops in position to control the action of said members in another direction, and transfer devices under the control of said accounting mechanism for controlling said members after the same have been restored by said stationary stop.

Signed at Chicago this 23d day of July, 1915.

RUDOW RUMMLER.